United States Patent [19]
Brown

[11] Patent Number: 5,269,258
[45] Date of Patent: Dec. 14, 1993

[54] HUMMINGBIRD AND LEPIDOPTEROUS FEEDER

[76] Inventor: Arthur C. Brown, P.O. Box 277, West Kingston, R.I. 02892

[21] Appl. No.: 26,500

[22] Filed: Mar. 5, 1993

[51] Int. Cl.⁵ .............................................. A01K 39/00
[52] U.S. Cl. ..................................... 119/57.9; 119/61; 119/72
[58] Field of Search ................ 119/72, 77, 61, 52.2, 119/52.3, 57.8, 57.9; 220/506; 206/394

[56] References Cited

U.S. PATENT DOCUMENTS

| | | | |
|---|---|---|---|
| D. 269,386 | 6/1983 | Khider | 119/61 |
| 1,801,932 | 4/1931 | Miller | 119/77 |
| 2,028,671 | 1/1936 | Kollman | 220/506 |
| 3,125,069 | 3/1964 | Fowler | 119/51 |
| 3,292,589 | 12/1966 | Williams | 119/77 |
| 3,301,220 | 1/1967 | Queen | 119/77 |
| 3,913,527 | 10/1975 | Kilham | 119/77 |
| 5,062,390 | 11/1991 | Bescherer et al. | 119/72 |

*Primary Examiner*—Wilson, John J.
*Assistant Examiner*—Todd E. Manahan
*Attorney, Agent, or Firm*—Barlow & Barlow, Ltd.

[57] ABSTRACT

An interchangeable feeder in the form of a dish container has a central ant trap with a surrounding moat. The moat has drain holes for excess fluid and surrounding the moat is a feed trough. A cover with a central aperture encloses the feed trough and a plurality of apertures through the wall of the cover allow access to the feed trough. In one form the cover has at least one tray like depression for the reception of fruit or other material that will attract an insect.

9 Claims, 1 Drawing Sheet

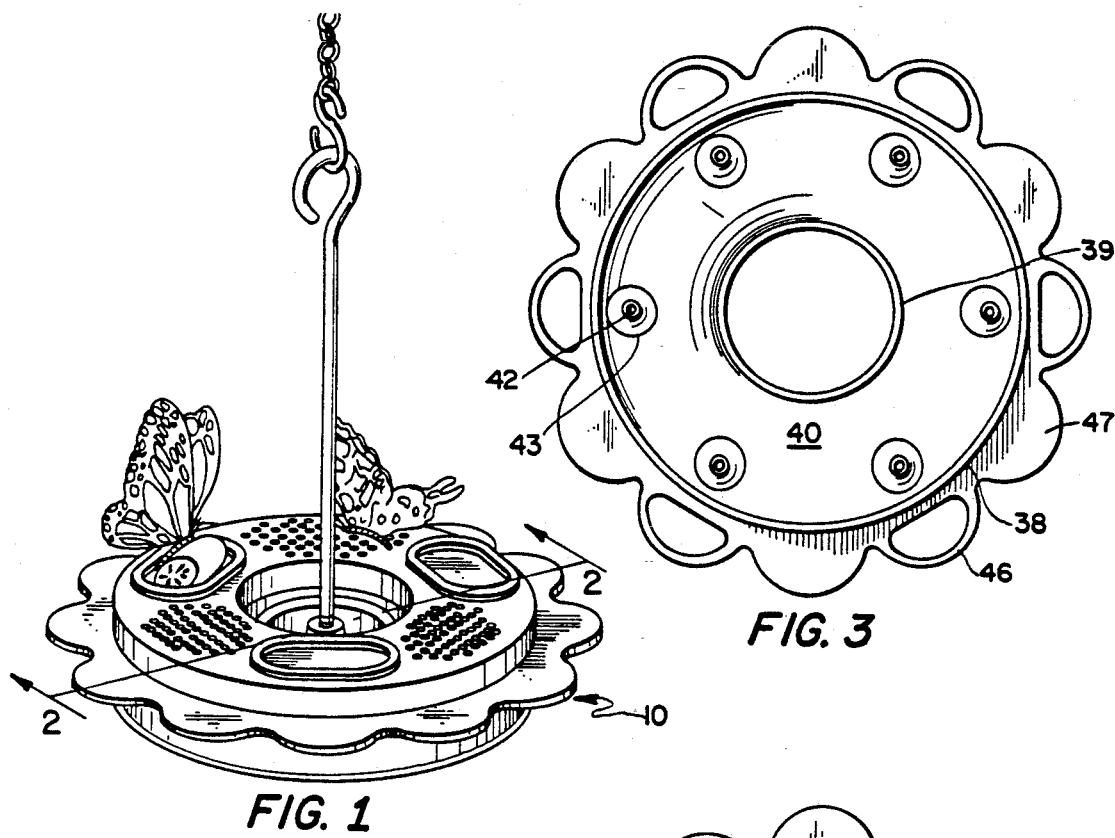
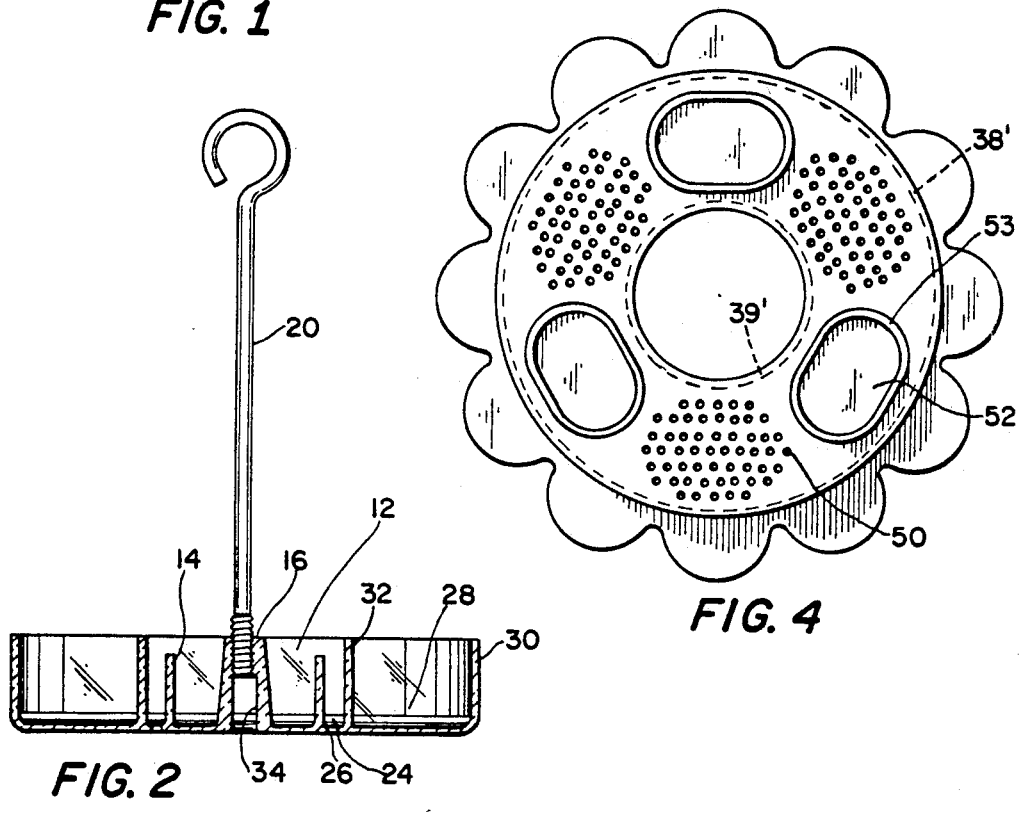

HUMMINGBIRD AND LEPIDOPTEROUS FEEDER

BACKGROUND OF THE INVENTION

This invention relates to bird and butterfly feeders of the type that are ordinarily supplied with a sweet liquid or nectar. A perfect feeder that supplies nectar is one that is ant proof, bee proof, self-cleaning and attractive. Nectar feeders are available in three basic designs. The basin feeder is exemplified in the Kilham U.S. Pat. No. 3,913,527, the basin bottle is exemplified by the Williams U.S. Pat. No. 3,292,589, and the tube bottle feeder is exemplified by the Fowler U.S. Pat. No. 3,125,069. The tube bottle has certain disadvantages as it is hard to clean, tends to drip in warm weather and is messy to refill, particularly if it is not completely empty. The basin bottle holds more liquid than a straight basin feeder but it too drips if jarred by the wind or larger birds and is messy to refill. The basin feeder is a vast improvement and as it holds the nectar out of reach of most insects and larger birds. It is sometimes thought that its small capacity is a disadvantage but it also can be an advantage as the nectar will ferment after a couple of days and the mold that develops is dangerous to butterflies and hummingbirds and can kill them.

The instant invention eliminates many of the problems in the prior art and provides in a simple unitary structure, a built-in ant trap in the form of a central water filled dish, an overflow moat extending about the ant trap and a food trough which may be filled with nectar. This trough surrounds the moat. The design is such that the out trap will not overflow to the outside of the feeder and dilute nectar. Further, the food trough has no crevices and features arcuate bottom corners for easy cleaning. The holes, whether in the butterfly design or the hummingbird cover design, prevents bees from getting inside. In addition the cover is a friction fit over the dish and it facilitates easy cleaning and filling by the user. Even if the cover should be dislodged by the wind, the suspending rod rising from the dish prevents the cover from being lost.

A broad object to the invention, therefore, is to provide a feeder constructed for hummingbirds and butterflies as effective for preventing ants and other insects from crawling into the nectar in the feeder. Another object of the invention is to provide a feeder which may have interchangeable tops so that either a hummingbird top with a hummingbird feeder port can be rested upon the feeder dish or a butterfly cover may be provided which will have openings for the proboscis of a butterfly and a space allocated to rotting fruit to attract the butterfly to the feeder.

DESCRIPTION OF THE DRAWINGS

FIG. 1 is a perspective view of a feeder construction in accordance with the invention hanging from an overhead support;

FIG. 2 is a sectional view of the base of the feeder taken on lines 2—2 of FIG. 1;

FIG. 3 is a bottom plan view of the hummingbird feeder cover;

FIG. 4 is a top plan view of the butterfly feeder cover.

DESCRIPTION OF THE PREFERRED EMBODIMENT

Referring to the drawings and more particularly, to FIGS. 2, 3 and 4, the feeder generally designated 10 consists of a central dish 12 having an upstanding wall 14 and a central boss 16. A threaded bore 18 is provided in the boss 16 into which a suspending rod 20 may be fitted. A moat 24 extends about the dish 12 and this moat is provided with apertures 26 through which excess fluid may be discharged. Due to the fact that the feeder is intended to be suspended from an overhead tree limb or the like, ants may very well find their way down the rod 20. Accordingly, the dish 12 is intended to be filled with water and will prevent ants from attempting to swim over to the feeding trough 28 which, as seen in FIG. 2, extends about the periphery of the moat 24. The feeding trough 28 is defined by a peripheral wall 30 and an inner wall 32 which also serves as the outer wall of the moat 24. In some cases it may be necessary to mount the dish on a post, and for that purpose a recess 34 is provided in the central boss 16.

A hummingbird cover is illustrated in FIG. 3 and is provided with two downwardly projecting flanges 38 and 39. Flange 38 is intended to embrace the outer face of the peripheral wall 30 while flange 39 is intended to embrace the inner face of the feeder trough wall 32. The flange 39 defines a central opening in the cover and exposes the central dish or ant trap 12 and its surrounding moat 24. The upper surface 40 of the hummingbird cover is slightly domed and is provided with a plurality of feeding apertures 42 which are of general funnel or tapered shape having an upper diameter as at 43 that tapers down to the diameter as seen in 42 in FIG. 3. The arrangement is such that the size will inhibit bees and other insects from trying to gain egress into the feeding trough and eliminates the need for providing screens or other deterrents found in some prior art feeders. The outer periphery of the hummingbird cover is provided with a number of perches 46 which consist essentially of an arcuate roost which are inter dispersed with solid sections 47 as the roosts and solid sections extend around the periphery of the cover.

In an alternate form, a butterfly cover as seen in FIG. 4 is provided, which cover is again formed with downwardly projecting flanges 38' and 39' to fit onto the feeding trough as described in connection with the hummingbird cover. The flange 39' defines a central opening in the cover to expose the dish 12 that serves as an ant trap together with its surrounding moat 24. The butterfly cover differs in configuration from the hummingbird cover and consists of a plurality of feeding apertures 50 that are circumferentially interspersed with depressions 52, each depression being surrounded by a lip 53. The arrangement is such that in the depressions 52, there may be placed some rotting fruit such as pears or cantaloupes, as some species of butterflies like fermenting fruit and are attracted by the rotting fruit. For further attraction, sometimes cognac can be placed on the fruit. The openings 50 are of a size to accommodate the proboscis of a butterfly which is coiled below the head and is uncoiled to drink or eat. The size of the apertures 50 is small enough to keep out bees and other flying insects.

In operation, the feeder trough 28 is filled with a suitable sugar solution which can be varied depending upon whether it is desired to attract butterflies or hummingbirds. For hummingbirds, the nectar may consist of approximately four (4) parts of water to one (1) part of sugar which, as noted above, should be changed every four to six days to prevent fermentation and mold developing. For butterflies, a solution consisting of sugar, molasses, fruit juice and stale beer has been found to be very effective along with over-ripe fruit. Accordingly, the feeder trough 28 should be filled so that it is at least a quarter of an inch from the top. The trough is sized to a dimension where the tongues of other hummingbirds or the proboscis, of butterflies can easily reach the bottom. In its preferred form, the depth of the trough is 1.25" (32 mm). The entire bottom container 12 is conveniently molded of a transparent plastic material which allows the user to readily determine the condition of the nectar, ascertaining for example, whether or not it has started to grow mold or it is necessary to refill the same. When it is necessary to refill, the entire structure should be removed and washed thoroughly with hot water and a little chlorine bleach or vinegar and then thoroughly rinsed.

I claim:

1. A feeder comprising a central dish, an overflow trough surrounding the central dish, a peripheral liquid food trough surrounding said overflow trough and defined by spaced upstanding walls, a boss in the central dish with means to attach a support means thereto, a cover extending over the liquid food trough having a central opening therein, said cover having feed openings in the cover and a peripheral perch edge.

2. A feeder as in claim 1 wherein said cover has spaced depressions alternating with said feed openings.

3. A feeder as in claim 1 wherein the feed openings in the cover are elongated and tapered with the diameter of the openings decreasing inwardly.

4. A feeder as in claim 1 wherein the peripheral perch edge of the cover includes perch members adjacent the feed openings.

5. A feeder for birds and insects comprising a central ant trap dish having an upstanding peripheral wall and a central post means for supporting the feeder, an overflow moat surrounding the central dish and having drain holes therein, a liquid food trough integral with and positioned outwardly of the moat, a cover for the food trough having means engaging the trough and feeding openings therethrough.

6. A feeder as in claim 5 wherein the central post means has a detachable coupling for attaching a support rod.

7. A feeder as in claim 5 wherein the food trough has an inner wall of greater height than the peripheral wall of the ant trap dish.

8. A feeder as in claim 5 wherein said cover has spaced depressions alternating with the feeding openings.

9. A feeder as in claim 8 wherein a plurality of feeding openings are provided between the depressions.

* * * * *